Dec. 7, 1965 C. J. RICKER ETAL 3,221,868
TROUGHING ROLLER ASSEMBLY
Filed Sept. 16, 1963
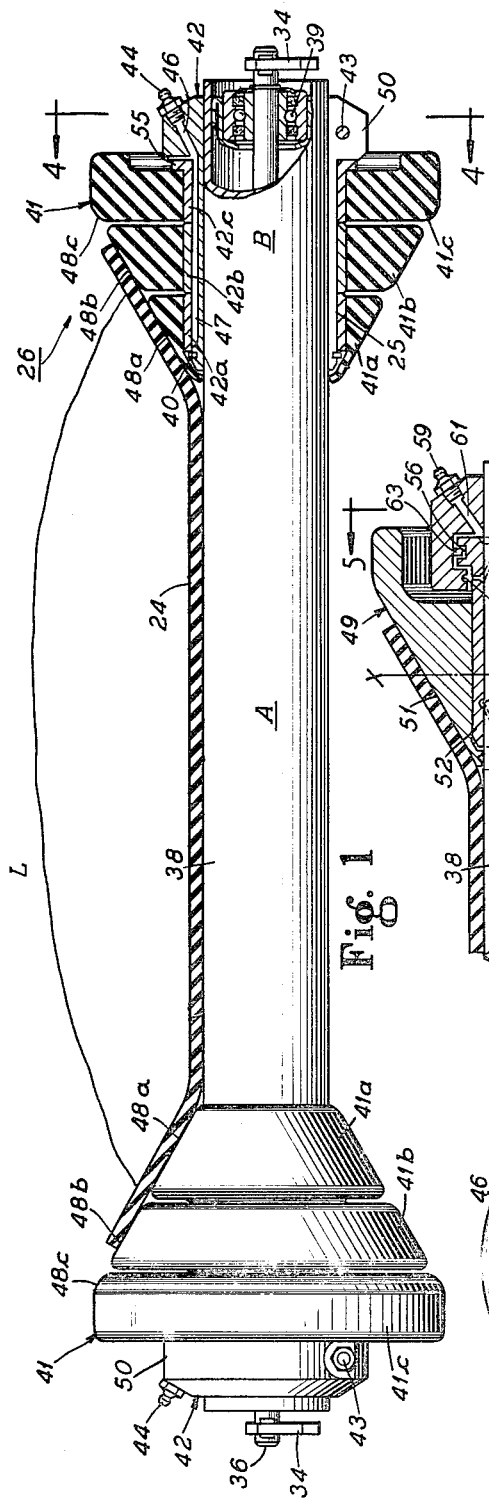
INVENTORS
Conrad J. Ricker
Donald C. Reilly
BY
Murray A. Gleeson
ATTORNEY ically to troughing roller assemblies for belt conveyors.

3,221,868
TROUGHING ROLLER ASSEMBLY
Conrad J. Ricker, Oak Forest, and Donald C. Reilly, Downers Grove, Ill., assignors to Goodman Manufacturing Company, Chicago, Ill., a corporation of Illinois
Filed Sept. 16, 1963, Ser. No. 309,140
5 Claims. (Cl. 198—192)

This invention relates generally to conveyors and particularly to troughing roller assemblies for belt conveyors.

One of the important objects of this invention is to provide a troughing roller assembly which can be used to convey material either on the upper run or the lower run of a conveyor belt. Thus, by using the present invention, a single conveyor belt can be used to convey materials, simultaneously, in both directions.

Another object is to provide a troughing roller assembly which can be made by merely adding wing rollers of the kind described to the end portions of an existing or conventional return idler roller.

Other objects and advantages will be apparent from the following description taken from the drawings in which:

FIGURE 1 is a troughing roller assembly according to the present invention as it might be applied to the lower run of a belt conveyor;

FIG. 2 is a partial side view of FIG. 1;

FIG. 3 is a partial view similar to FIG. 1 showing an alternate form of troughing roller assembly; and FIGS. 4 and 5 are cross sectional views of FIGS. 1 and 3 respectively taken along the lines 4, 4 and 5, 5.

Like parts are designated by like reference characters throughout the figures of the drawing.

Referring now to FIG. 1, the troughing roller assembly 26 is end-supported in any suitable way, for example by brackets 34, 34, partially shown, which may be mounted in the usual way to determine the operating height of the belt run 24 atop the roller assembly. The run 24 may be either the upper or lower, or both, depending on the conveying requirements of a particular installation.

A supporting shaft 36 has a double-flatted portion at each end non-rotatably held in an upwardly open slot 37 in each bracket.

A center roller 38, which supports the center portion of the belt run 24, is coaxial with the shaft 36 and is journaled for rotation about it by anti-friction means, in this case a pair of bearings 39, 39.

A pair of cone-shaped wing rollers 41, 41, each consisting of a series of axially aligned independently rotatable cone sections 41a, 41b and 41c, carries the side portions of the belt run 24 and guides it in a troughed-shape so the belt can carry a load L without spillage. The wing rollers are coaxial with and spaced apart on the center roller 38. They are oppositely disposed, with their larger-diameter ends facing outwardly to provide the desired troughed belt shape.

The multi-section wing rollers are held in place and journaled for rotation about the ends of the center roller by anti-friction means supported on a bushing or sleeve 42. As shown in FIG. 4, this is split longitudinally and is tightened into frictional engagement with the center roller surface B by bolt 43. The end portions B, B of the cylindrical roller 38 are substantially-same-diameter, straight-line extensions of the cylindrical surface A.

The wing roller anti-friction means here comprises sleeve bearings 42a, 42b and 42c which may be tightly fitted respectively into the sections 41a, 41b and 41c. These sleeve bearings run on the cylindrical outer surface 25 of the split bushing. The sleeve bearings 42a, etc., may be made of permanently lubricated material such as oil-impregnated sintered powdered bearing metal. Additional lubricating means may be provided in the form of an outer grease fitting 44 which connects, through passage 46, in the flange 50, and an external longitudinal groove 47 on bushing 42, to add lubricant as needed to the sliding interface between bearing sleeves 42a, etc., and the split bushing outer bearing surface 25.

Note that sleeve bearings 42a and 42b are straight cylinders. The outer end sleeve bearing 42c has a small flange 55 serving as an end bearing against the split flange 50.

The wing roller sections 41a, 41b and 41c are different in shape and size to provide the overall cone-like shape. They may be made of any suitable metal such as steel; a plastics material such as "nylon"; or an elastomeric material such as "neoprene" (shown).

To assemble one of the wing rollers 41, a snap ring 40 and the three roller sections 41a, etc., with their integral bearing sleeves are slipped over the end of the center roller, preferably into the central area A. The split bushing 42 is snugged into place by its bolt 43. Sections 41a, etc., are slid into place on the bushing and held by snap ring 40 in an external groove formed on the bushing.

An important feature of the embodiments shown is that the center roller end portions which carry the wing rollers can be the same diameter as the center cylindrical portion which engages the center part of the belt run 24. In other words, end parts B, B can simply be same-diameter, straight-line extensions of the middle part A. In many cases this enables using an existing or conventional return roller for the element 38.

Another embodiment, shown in FIG. 3, differs from that of FIG. 1 in two respects: *first*, the wing roller 49 is one-piece, having a continuous tapered or cone-like belt engaging surface 51; and *second*, its sleeve bearing 52 is one-piece and is rotatably mounted *directly* on the corresponding end part B of the center roller.

The wing roller 49 has the same shape as the overall shape of the multi-section roller 41 and may be made of one of the materials specified for the latter (steel being shown). It is bonded or otherwise made integral with the sleeve bearing 52 which may be made of permanently lubricated material as described for bearings 42a, etc.

The outer end of the wing roller 49 is bell mouthed to receive the inner end of a two-piece split bushing 57 held on the center roller by bolts 58, 58 (FIG. 5). The outer end of the sleeve bearing 52 has a flange 60 which is embraced within a cavity 65 of bushing 57 to limit end play of the wing roller 49 relative to the center roller 38.

A grease fitting 59 connects through passage 61 and groove 62 to the rotating interfaces between members 38 and 52. A labyrinth, which when filled with grease, includes the clearance space between the flange 60 and the cavity 65; the clearance between a thin, inward flange 63 and groove 56 in the flange 60; an inward groove 64 in the bushing; and the space 66 between the bushing and wing roller.

The troughing roller assembly, using wing roller 49, is assembled by sliding the wing roller, together with its integral bearing sleeve 52, over the end of the center roller, then bolting the two-piece bushing into frictional engagement with the center roller.

The multiple element wing roller 41 minimizes scuffing friction against the belt by enabling the different sections to rotate at different speeds. Thus, the peripheral speed of each approximates the lineal speed of the belt.

Where scuffing is not important, and a certain amount is tolerable, the one-piece wing roller 49 will be preferred because it is simpler and cheaper. In that case, there will be some area, illustrated by the line X—X, where the peripheral wing roller speed and belt lineal speed are the same. Outside of X—X the roller peripheral speed is greater than the belt lineal speed and inside X—X the peripheral speed is less than the lineal speed. Generally, scuffing can be ignored and one-piece wing rollers used where the wing rollers are relatively short and the loads are light or medium. For long wing rollers and heavy duty services, use the multi-section wing rollers.

While the invention has been described in terms of two closely related embodiments which have been developed for a wide range of applications, the scope of the invention should not be deemed to be limited by the precise embodiments illustrated, other embodiments being intended to be revised especially as they fall within the scope of the claims here appended.

We claim:

1. A troughing roller assembly comprising:
a supporting shaft;
means for supporting the ends of the shaft and holding it against rotation;
an inner center roller coaxial with the shaft and having a cylindrical surface adapted to carry the center portion of a conveyor belt;
anti-friction means between the shaft and center roller enabling the roller to rotate around the shaft;
a pair of wing rollers coaxial with and spaced apart along the center roller and means rotatably mounting a wing roller on each end of said center roller, said mounting means comprising a split sleeve mounted on the center roller, means for contracting the sleeve to frictionally grip said center roller, and means for retaining the wing rollers on their respective split sleeve, each wing roller having a generally conical surface adapted to carry a respective side portion of a conveyor belt, the wing rollers being oppositely disposed with their larger diameter ends facing outwardly to provide a troughed contour to a belt support thereon;
and anti-friction means between the center roller and each wing roller enabling each wing roller to rotate around the center roller in the same direction as the center roller but at a different rate and independently of the rotation of the center roller.

2. A troughing roller assembly according to claim 1 in which each wing roller comprises a series of axially aligned independently rotatable sections adapted to rotate at different speeds while carrying a moving conveyor belt.

3. A troughing roller assembly according to claim 1 in which the wing rollers are rotatable about center roller end portions which are substantially same-diameter, straight-line extensions of the cylindrical surface which is adapted to carry the center portion of a conveyor belt.

4. A troughing roller assembly according to claim 3 in which the wing rollers are directly journaled on the "same-diameter" end portions of the center roller.

5. A troughing roller assembly according to claim 4 having anti-friction means between the wing rollers and the end portions of the center roller.

References Cited by the Examiner

UNITED STATES PATENTS

| 203,825 | 5/1878 | Healey | 198—192 |
| 499,472 | 6/1893 | Robins | 198—192 X |
| 714,812 | 12/1902 | Mann et al. | 198—192 |
| 1,636,051 | 7/1927 | Francisco | 198—192 |
| 2,561,708 | 7/1951 | Milik | 198—192 X |
| 2,647,618 | 8/1953 | McLachlan | 198—192 |

FOREIGN PATENTS 594,035  3/1934  Germany.

SAMUEL F. COLEMAN, *Primary Examiner.*

R. E. KRISHER, *Assistant Examiner.*